United States Patent
Smithwick

(10) Patent No.: US 11,435,504 B2
(45) Date of Patent: Sep. 6, 2022

(54) ANGLE ENHANCING SCREEN

(71) Applicant: Disney Enterprises, Inc., Burbank, CA (US)

(72) Inventor: Quinn Yorklun Jen Smithwick, Pasadena, CA (US)

(73) Assignee: Disney Enterprises, Inc., Burbank, CA (US)

(*) Notice: Subject to any disclaimer, the term of this patent is extended or adjusted under 35 U.S.C. 154(b) by 139 days.

(21) Appl. No.: 16/454,186

(22) Filed: Jun. 27, 2019

(65) Prior Publication Data

US 2020/0408964 A1    Dec. 31, 2020

(51) Int. Cl.
   *G03B 21/625*    (2014.01)
   *G02B 3/08*      (2006.01)
   *G03B 21/602*    (2014.01)

(52) U.S. Cl.
   CPC ............. *G02B 3/08* (2013.01); *G03B 21/602* (2013.01); *G03B 21/625* (2013.01)

(58) Field of Classification Search
   CPC ...... G02B 3/08; G02B 30/00; G02B 27/0081; G02B 5/02; G02B 27/22; G02B 27/2214; G02B 3/0006; G02B 3/0062; G02B 3/0068; G02B 2027/0134; G02B 30/27; G02B 2027/0123; G03B 21/00; G03B 21/602; G03B 21/625; G03B 21/606
   See application file for complete search history.

(56) References Cited

U.S. PATENT DOCUMENTS

| | | | |
|---|---|---|---|
| 2006/0158614 A1* | 7/2006 | Eichenlaub | G03B 21/00 353/7 |
| 2013/0069933 A1 | 3/2013 | Smithwick et al. | |
| 2014/0177032 A1* | 6/2014 | Woodgate | H04N 13/366 359/298 |
| 2014/0300869 A1* | 10/2014 | Hirsch | G02B 30/27 353/7 |

(Continued)

OTHER PUBLICATIONS

Okoshi, Takanori. Three-dimensional imaging techniques. Elsevier, 2012. [Abstract Only].

(Continued)

*Primary Examiner* — Darryl J Collins
*Assistant Examiner* — Matthew Y Lee
(74) *Attorney, Agent, or Firm* — Patterson + Sheridan, LLP

(57) ABSTRACT

Implementations of angle-enhancing screens are disclosed herein. The angle-enhancing screens increase the field of view of an image projected thereon by a projection lens while maintaining an increased size of the projected image, by decreasing the size of picture elements making up the image while maintaining their pitch. In some embodiments, the angle-enhancing screen includes a field lens, such as a Fresnel field lens, for straightening the views of light projected thereon and a double lenslet array of matched lenslet pairs, each of the pairs including either two positive lenslets or one positive and one negative lenslet, for increasing the field of view. In another embodiment, the angle-enhancing screen may include a field lens and an array of four positive lenslet quartets. In a further embodiment, the field lens may be replaced with a Gabor superlens including two lenslet arrays of different pitches.

21 Claims, 17 Drawing Sheets

(56) References Cited

U.S. PATENT DOCUMENTS

2017/0261758 A1* 9/2017 Powell ................ G02B 3/0062

OTHER PUBLICATIONS

Wojciech, M., Pfister, H., "3D TV: A Scalable System for Real-Time Acquisition, Transmission and Autostereoscopic Display of Dynamic Scenes," Mitsubishi Electric Research Laboratories, Dated: Dec. 2004, pp. 1-13.

Michael Bass, "Materials and Modulators for True 3-Dimensional Displays," ResearchGate, Dated Sep. 2005, pp. 1-67 [The main related art for this article is on p. 35].

* cited by examiner

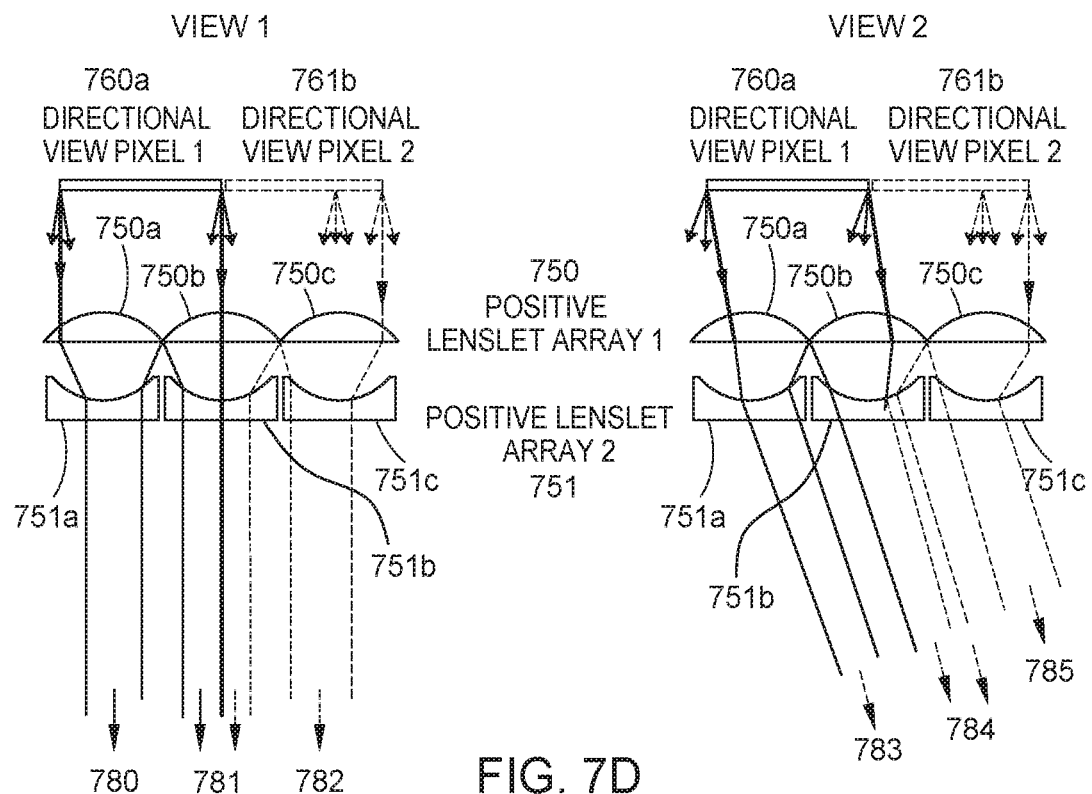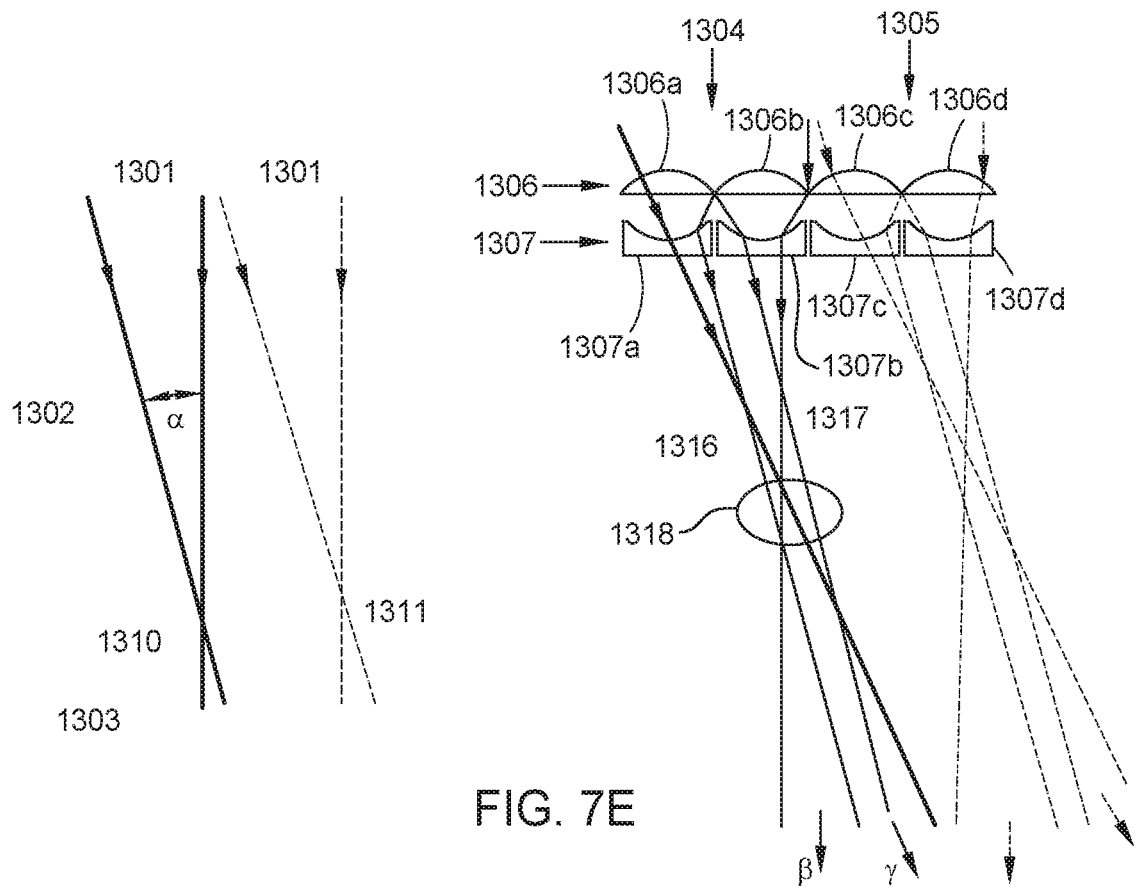
FIG. 7D
FIG. 7E

ANGLE ENHANCING SCREEN

BACKGROUND

Field

The present disclosure relates generally to projection screens.

Description of the Related Art

Holography is a display medium allowing the reproduction of all three-dimensional (3D) cues. Spatial light modulators (SLMs), including digital micromirror devices (DMDs) and liquid crystal on silicon (LCOS), have been used to produce dynamically programmable holograms. However, such SLMs typically have small areas of about one square inch and coarse pixel pitches of about 10 micrometers. As a result, many SLMs can only produce small holograms of about one square inch and small fields of view of about 3°. Optical demagnification can be used to increase either the size or the field of view of holographic videos produced by SLMs, but the size and field of view cannot be increased simultaneously through such demagnification. This is due to the "optical invariant," which requires that the product of the angle and the field of view of light rays be a constant throughout space.

Other types of 3D displays, such as optical vortex displays, can also produce dense multiview images, but with relatively small images and small fields of view. Similar to the holograms described above, such images can be optically demagnified to trade off size or field of view, but the size and field of view cannot be increased simultaneously through demagnification (due to the optical invariant).

SUMMARY

One embodiment of this disclosure provides an angle-enhancing screen. The angle-enhancing screen generally includes a first lenslet array and a second lenslet array. The first and second lenslet arrays are configured to increase a field of view of light that passes through the first and second lenslet arrays.

Another embodiment of this disclosure provides a display system. The display system generally includes a three-dimensional (3D) display configured to generate at least one 3D image. The display system further includes a projection lens configured to project the at least one 3D image onto an angle-enhancing screen. The angle-enhancing screen includes a double lenslet array configured to increase a field of view of the at least one 3D image projected onto the angle-enhancing screen.

Another embodiment of this disclosure provides an additional display system. The display system generally includes a three-dimensional (3D) display configured to generate at least one 3D image. The display system further includes a projection lens configured to project the at least one 3D image onto an angle-enhancing screen. The angle-enhancing screen includes a double lenticular configured to increase a field of view of the at least one 3D image projected onto the angle-enhancing screen. In addition, the display system includes a vertical diffuser.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 7D and 7E illustrate Galilean lens array as an angle-enhancing screen for light fields and collimated multiview displays, and for holographic, volumetric or other variable wavefront 3D displays or objects according to an embodiment, without stray views or ghost points.

DETAILED DESCRIPTION

Various implementations of angle-enhancing screens are disclosed herein. The angle-enhancing screens increase the field of view of an image projected thereon by a projection lens while maintaining an increased size of the projected image, by decreasing the size of picture elements (e.g., pixels, direls, hogels, etc.) making up the image while maintaining their pitch (spacing relative to each other). As a result, both the size and field of view of the image is increased. In some embodiments, the angle-enhancing screen includes a field lens for straightening the views of light projected thereon and a double lenslet array of matched lenslet pairs for increasing the field of view. In such cases, the field lens may be a Fresnel field lens, and the double lenslet array may include an array of Keplerian lens pairs, which are pairs of positive (converging) lenses that result in flipped views, or an array of Galilean lens pairs, which are pairs of negative (diverging) and positive lenses that do not flip views. In another embodiment, the angle-enhancing screen may include a field lens and an array of four positive lenslet quartets, which is equivalent to two Keplerian lens pair arrays in series, to demagnify and flip an image twice, resulting in a magnified and upright (unflipped) image. In a further embodiment, the field lens may be replaced with a Gabor superlens including two lenslet arrays, such as an array of Keplerian or Galilean lens pairs, of different pitches.

Figure 1A:
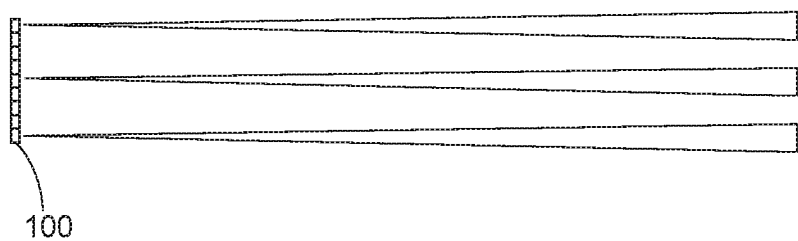
FIGS. 1A-1B illustrates a hologram being produced by a spatial light modulator, with and without a projection lens.

Referring now to FIG. 1A, a hologram being produced by a spatial light modulator (SLM), with and without a projection lens, is shown. As shown in panel A, a SLM for holovideo may utilize a digital micromirror device (DMD) 100 to create a hologram. However, as very dense lines in a diffraction grating are required to bend light at angles necessary to create the distribution and focus of light for a typical hologram, devices such as the DMD 100 may have pixel pitches, which define the diffraction grating pitch, on the order of 10 microns so as to produce 3° of deflection. Further, the entire DMD 100 may be about one square inch in size, resulting in a relatively small hologram of about one square inch and a small field of view of about 3°. As the number of views (or number of controllable light directions) is related to the number of pixels in a modulator, a high-definition DMD may produce, e.g., 1000-2000 views or controllable light directions, but with only about a 3° field of view and for about one square inch size. Multiple such DMDs may be tiled together to generate holograms with larger spatial areas, but the field of view will remain small.

Figure 1B:
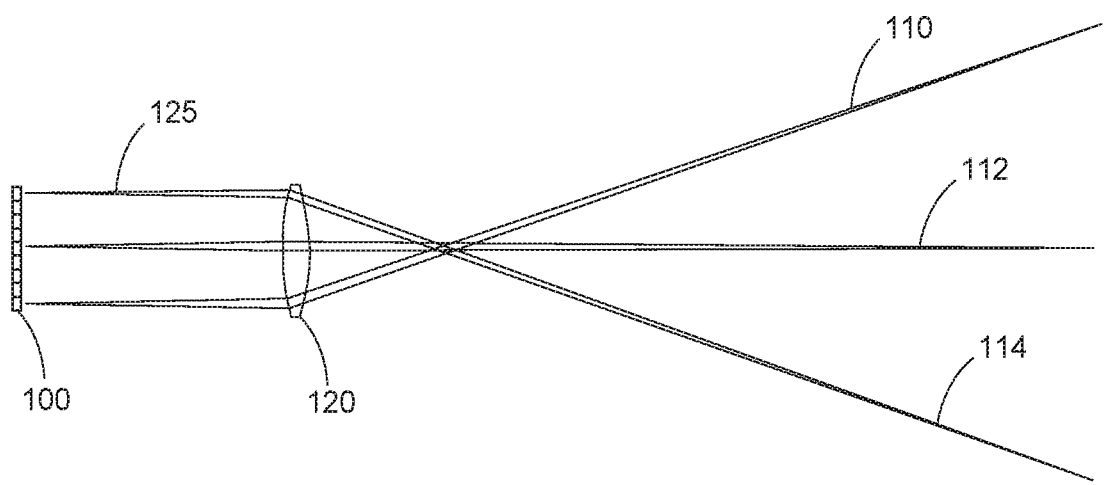

FIG. 1B illustrates the use of a projection lens 120 to increase the size of a holographic image 125 generated by the DMD 100. As shown, light from the DMD 100 for the holographic image 125 is passed through the projection lens 120, which enlarges the holographic image 125 spatially. However, due to the "optical invariant," which as described requires that the product of the angle and the field of view of light rays be a constant throughout space, the field of view of the holographic image 125 is proportionally reduced when the holographic image 125 is enlarged by the projection lens 120. Such a reduced field of view reduces the angles that viewers can see the 3D scene by looking or moving around. The view order or distribution of light in the wavefront remains the same, but they are compressed within the field of view. In addition, views of the holographic image (e.g., views 110, 112, and 114) are skewed, splayed, or biased, rather than facing forward (toward a viewer), as a result of the projection. As used herein, skewed, biased, and splayed refer to the field of view (or the directions of light rays) not being symmetric about the optical axis of the lens/screen. However, the view directions of the enlarged projected image should remain the same as from the 3D image source to maintain a coherent 3D image after projection (unless skewed views are accounted for in the generation of the original 3D imagery).

Figure 2:
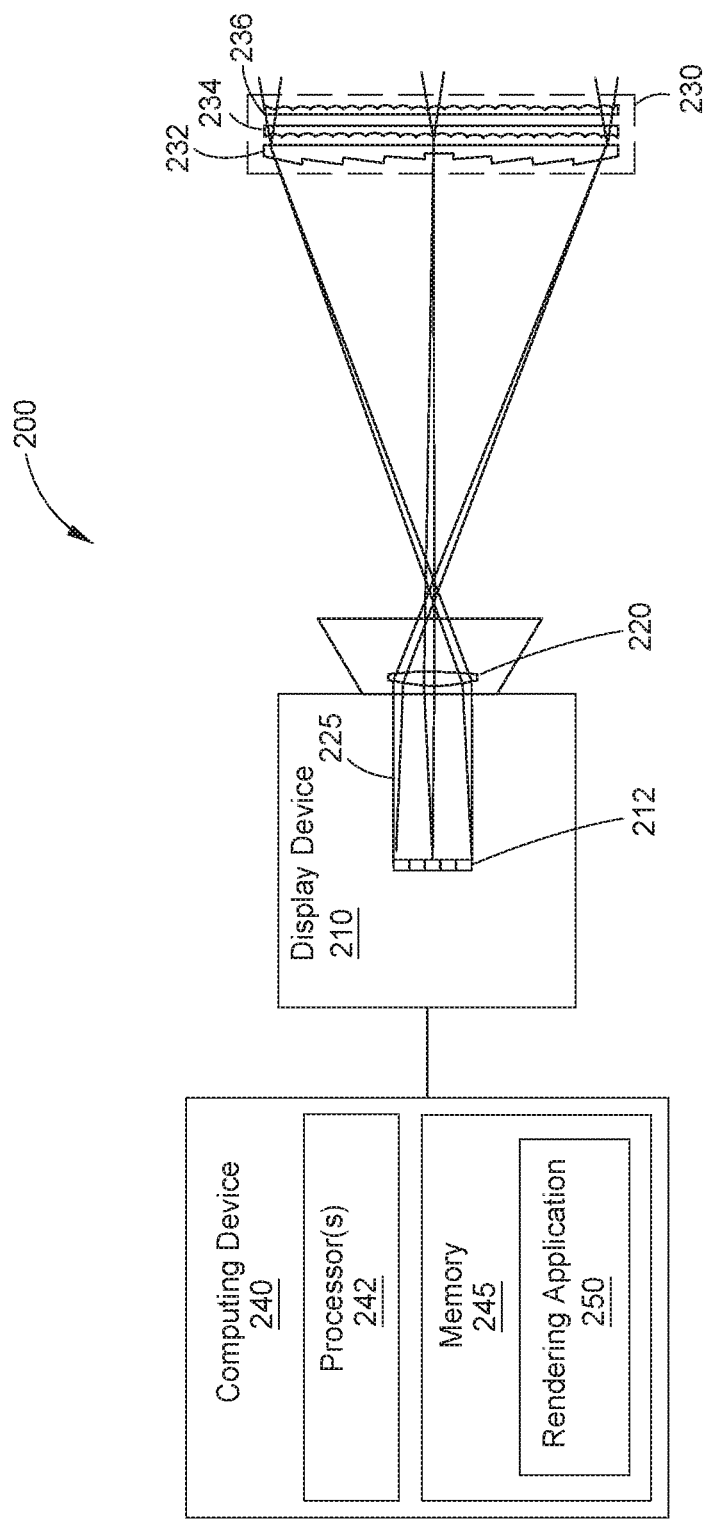
FIG. 2 illustrates a display system, according to an embodiment.

FIG. 2 illustrates a display system 200, according to an embodiment. As shown, the display system 200 includes a three-dimensional (3D) display device 210, an angle-enhancing screen 230, and a computing device 240 configured to execute a rendering application 250 stored in memory 245. As shown, the computing device 240 includes processor(s) 242 and the memory 245. The processor(s) 242 generally retrieve and execute programming instructions stored in the memory 245. The processor(s) 242 are included to be representative of a single central processing unit (CPU), multiple CPUs, a single CPU having multiple processing cores, and/or graphics processing units (GPUs) having multiple execution paths, and the like. The memory 245 is generally included to be representative of a random access memory, but may further include non-volatile storage of any suitable type(s).

Illustratively, the memory 245 includes the rendering application 250, which is configured to determine patterns to place on a DMD 212 in the 3D display device 210 in order to generate 3D images, such as holovideo images. In addition to the DMD 212, the 3D display device 210 includes a projection lens 220 that projects the generated 3D images onto the angle-enhancing screen 230. For example, a 3D image 225 that is generated by the DMD 212 in the 3D display device 210 may be a 1" diagonal rectangle that is projected onto the angle-enhancing screen 230 to enlarge its size to 13-80" diagonal. Although the projection lens 220 increases the spatial size of a 3D image's wavefront 225, the field of view of the image 225 is proportionally reduced when the image 225 is enlarged by the projection lens 220 due to the optical invariant, and the views of the projected image are also skewed, splayed, or biased, rather than facing forward, as described above.

The angle-enhancing screen 230 is configured to straighten the views of the projected 3D image 225 and increase the field of view. As shown, the angle-enhancing screen 230 includes a field lens 232 and a double lenslet array including arrays of lenses 232 and 234. As used herein, "double lenslet array" refers to a double fly-eye array of lenses, and each of the lenses in such an array is also referred to herein as a "lenslet." Illustratively, the field lens 232 is a Fresnel field lens, and the double lenslet array includes an array of Galilean lens pairs, which are pairs of negative and positive lenses that do not flip views. In another embodiment, the double lenslet array may include an array of Keplerian lens pairs, which are pairs of positive lenses that do result in flipped views. In yet another embodiment, an array of four positive lenslet quartets, which is equivalent to two Keplerian lens pair arrays in series, may be used. In a further embodiment, the field lens 232 and double lenslet array may be replaced with a Gabor superlens including two lenslet arrays of different pitches, as discussed in greater detail below.

Figure 3:
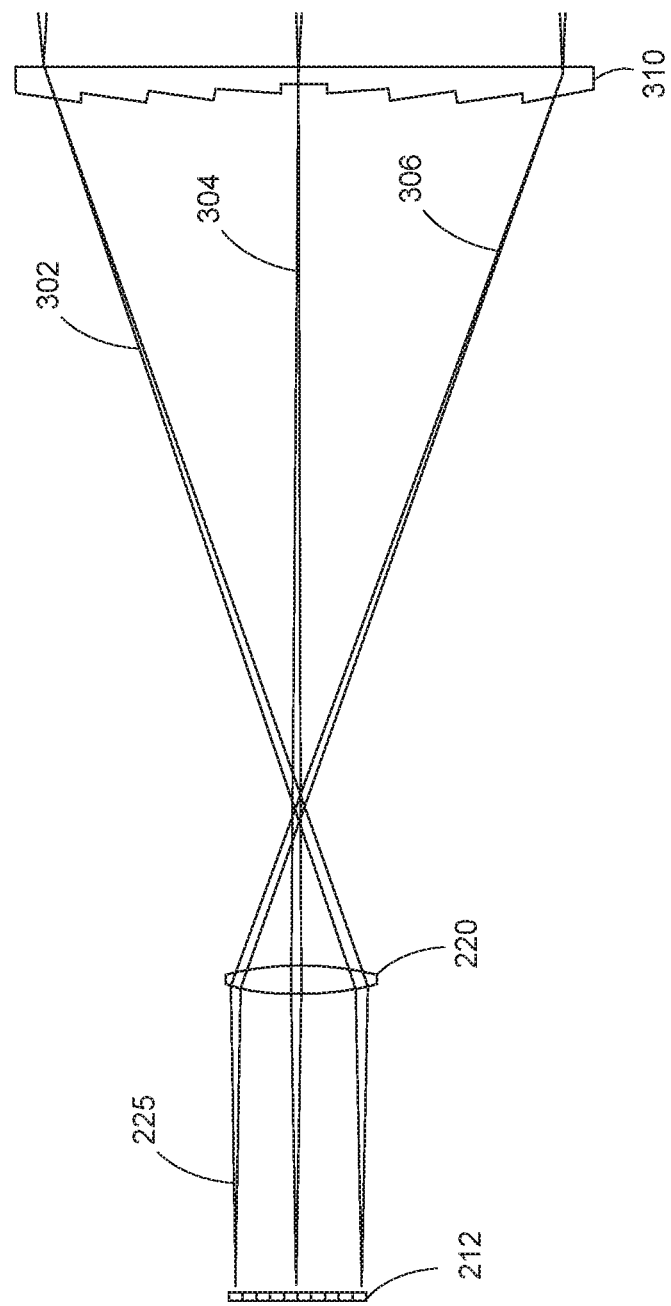
FIG. 3 illustrates a Fresnel field lens projection screen, according to an embodiment.

FIG. 3 illustrates a Fresnel field lens projection screen 310, according to an embodiment. As shown, the Fresnel field lens screen 310 acts to straighten the views (e.g., the views 302, 304, and 306) of the holographic image 225 generated by the DMD 212 and projected by the projection lens 220. Although described herein with respect to Fresnel field lenses, other types of field lenses may also be used in lieu of Fresnel field lenses in some embodiments. The projection lens 220 is configured to project the image 225 generated by the DMD 212 against the Fresnel field lens screen 310, which may be, e.g., mounted on a wall such that viewers on the other side of the wall can freely view the 3D image (e.g., a holovideo image) without wearing 3D glasses. In particular, the projection lens 220 may be used to focus a small imaging chip that is illuminated inside the display device 210 onto the Fresnel field lens screen 310, such that the image size on the screen 310 is much larger than the original image size and the image is in focus on substantially all parts of the screen 310. As described, the image 225 may be, e.g., a 1" diagonal rectangle and projected onto a screen to enlarge its size to, e.g., 13-80" diagonal. As the image is being magnified, the projection lens 220 should generally be of high quality. Some commercially available projection lenses include multiple (e.g., 6-12) lenses, which may be aspheric lenses.

In operation, the 3D image 225 generated by the DMD 212, is passed through the projection lens 220, which as described enlarges the image 225 spatially. However, the field of view of the image 225 is proportionally reduced when the image 225 is enlarged by the projection lens 220 due to the optical invariant. Such a reduced field of view reduces the angles that viewers can see by looking around. In addition, the view zones are skewed (or biased) rather than facing forward as in the original 3D imagery, as the direction of light projected by the projection lens 220 is splayed outwards. In the illustrated embodiment, the Fresnel field lens screen 310 straightens the skewed views so that view directions in the 3D image 225 are maintained even after being projected in front of the Fresnel field lens screen 310, maintaining a coherent 3D scene. In particular, the Fresnel field lens 310 may be placed at or near an image plane of the projected modulator to redirect and reorient views which are biased due to the projection by the projection lens 220.

Figure 4:
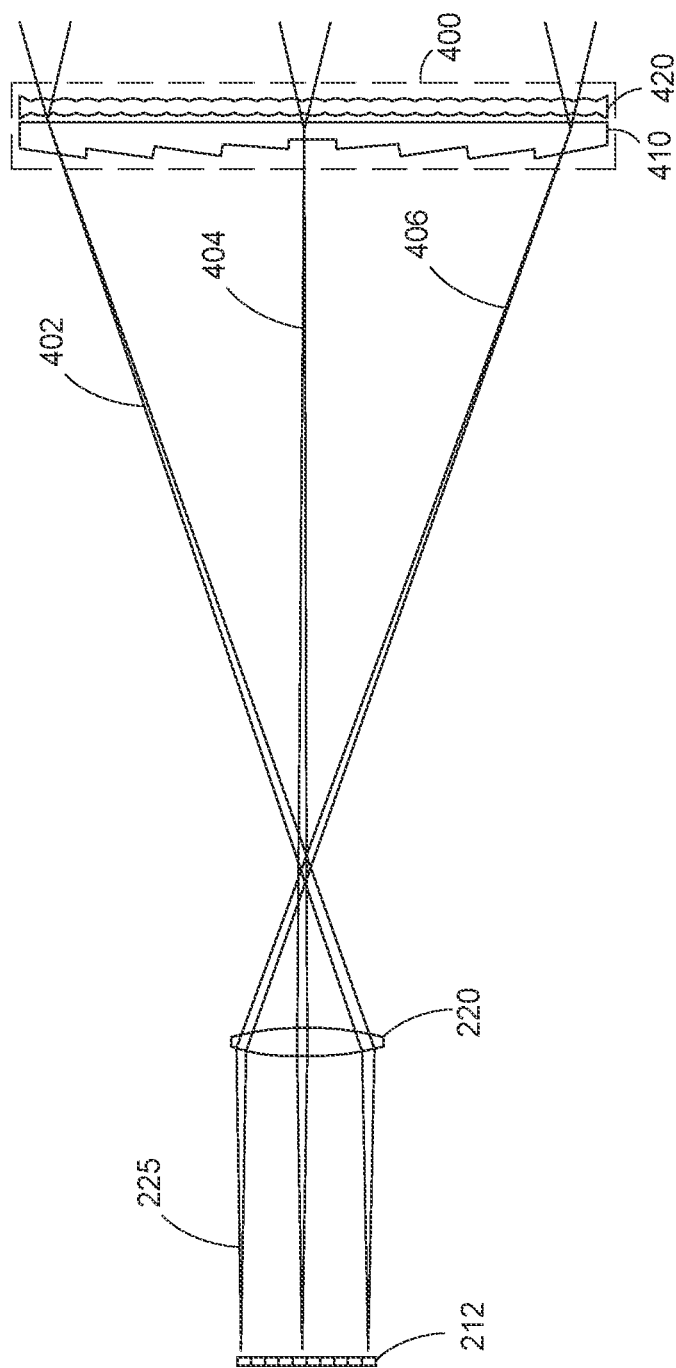
FIG. 4 illustrates an angle-enhancing screen, according to an embodiment.

FIG. 4 illustrates an angle-enhancing screen 400, according to an embodiment. As shown, the angle-enhancing screen 400 includes a Fresnel field lens 410 and an array of Keplerian lens pairs 420. The array of Keplerian lens pairs 420 is a double lenslet array that includes matched lenslet pairs in the array that each uses two positive lenses to form a magnifier, i.e., a Keplerian telescope. Similar to the Fresnel field lens 310 discussed above with respect to FIG. 3, the Fresnel field lens 410 is configured to straighten skewed views (e.g., views 402, 404, and 406) produced by the projection lens 220. Each Keplerian lens pair in the array of Keplerian lens pairs 420 acts to shrink a respective pixel size and increase a field of view of that pixel, by focusing the pixel's ray bundle to create a larger field of view while maintaining its location. Although discussed herein primarily with respect to pixels, embodiments may generally decrease the size of any image element, such as a direl, a hogel, etc., making up an image, while maintaining the spacing relative to each other.

Figure 5A:
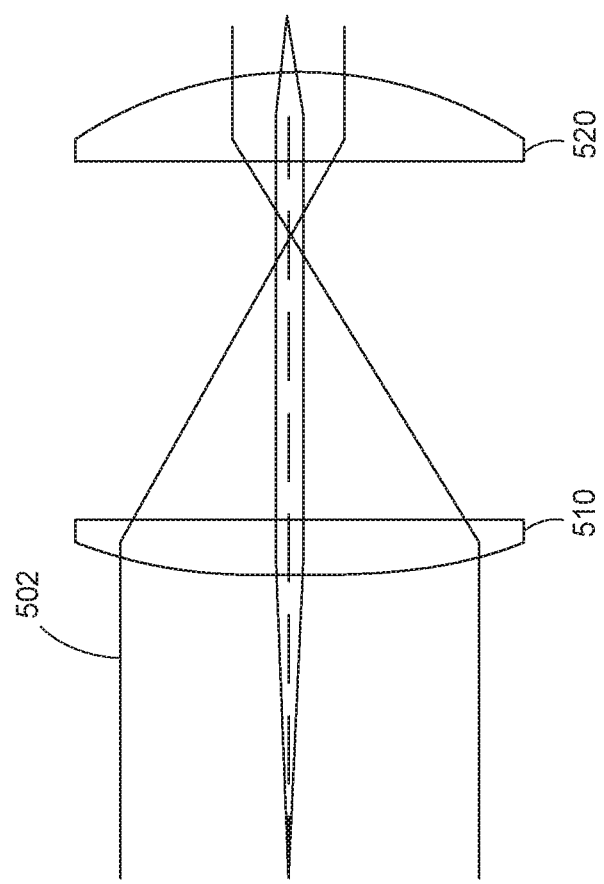
FIG. 5A illustrates a Keplerian lens pair in the angle-enhancing screen of FIG. 4, according to an embodiment.

FIG. 5A illustrates an example Keplerian lens pair 510 and 520 in the array of Keplerian lens pairs 420 of the angle-enhancing screen 400, according to an embodiment. As shown in panel A, the lens pair 510 and 520 are positive (converging) lenses that operate to decrease an image pixel size (area) when light for the pixel passes through the lens pair 510 and 520 (from left to right in FIG. 5A). Illustratively, the pair of lenses 510 and 520 are curved back-to-back lenses, with collimated parallel light that enters the lens 510 being focused between the lenses 510 and 520 at a point that is closer to the lens 520, expanded out again, and deflected by the lens 520 to become a collimated parallel light beam that is less thick than the collimated parallel light beam that originally entered the lens 510. At the same time that the Keplerian lens pair 510 and 520 decreases the size of the pixel, the Keplerian lens pair 510 and 520 creates a larger field of view. This is a result of the optical invariant, which requires a decrease in size to be associated with an increased field of view in order for the product of the size and field of view to remain constant. It should be understood that, as a result of the smaller pixel sizes, there may be gaps between pixels. However, such gaps may be acceptable if, e.g., viewers are far enough away that they have difficulty seeing the gaps. That is, the lenslet pairs (e.g., the Keplerian lens pair 510 and 520) in the array of Keplerian lens pairs 420 act as afocal magnifiers to increase a section (e.g., pixel, direl, hogel, etc.) of the projected image field of view while shrinking the size of that section, such that the distance between section centers remains the same and the overall image size remains same, but the image sections/portions themselves are shrunk. In addition, the two positive lenses of the Keplerian lens pair 510 and 520 will flip each elemental/section of the 3D image that passes through the lenses 510 and 520, which flips the view order (or orientation of the wavefront distribution) as well. In particular, if the lenslets in the array of Keplerian lens pairs 420 are not matched and aligned with the corresponding projected image (due to projection aberrations), views may be flipped and arranged out of order.

Figure 5B:
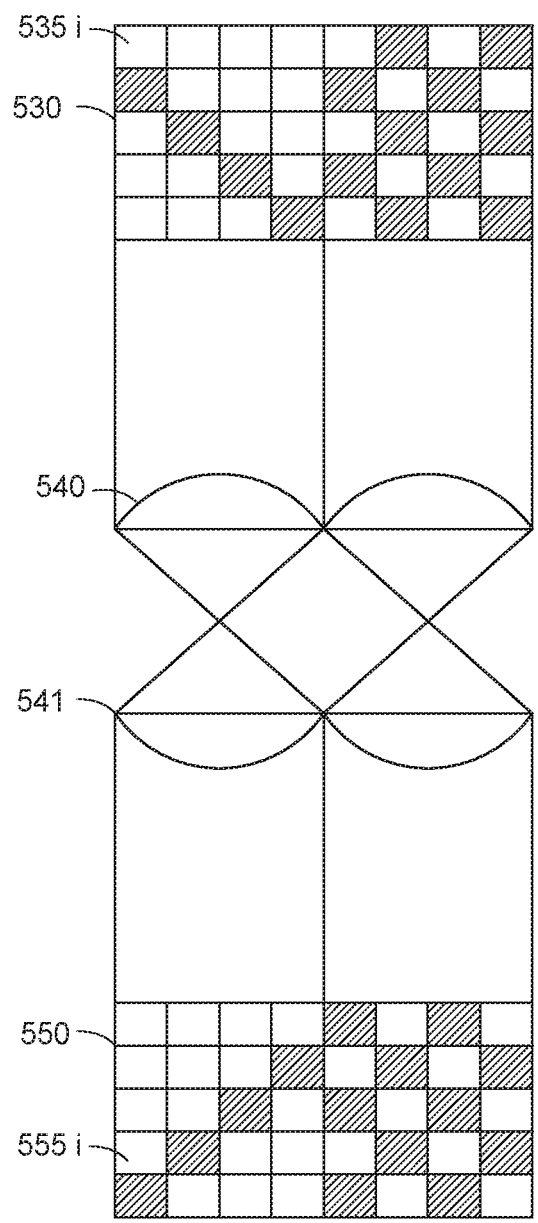
FIGS. 5B-5C illustrate examples of exact and inexact image set-to-lens alignments.
Figure 5C:
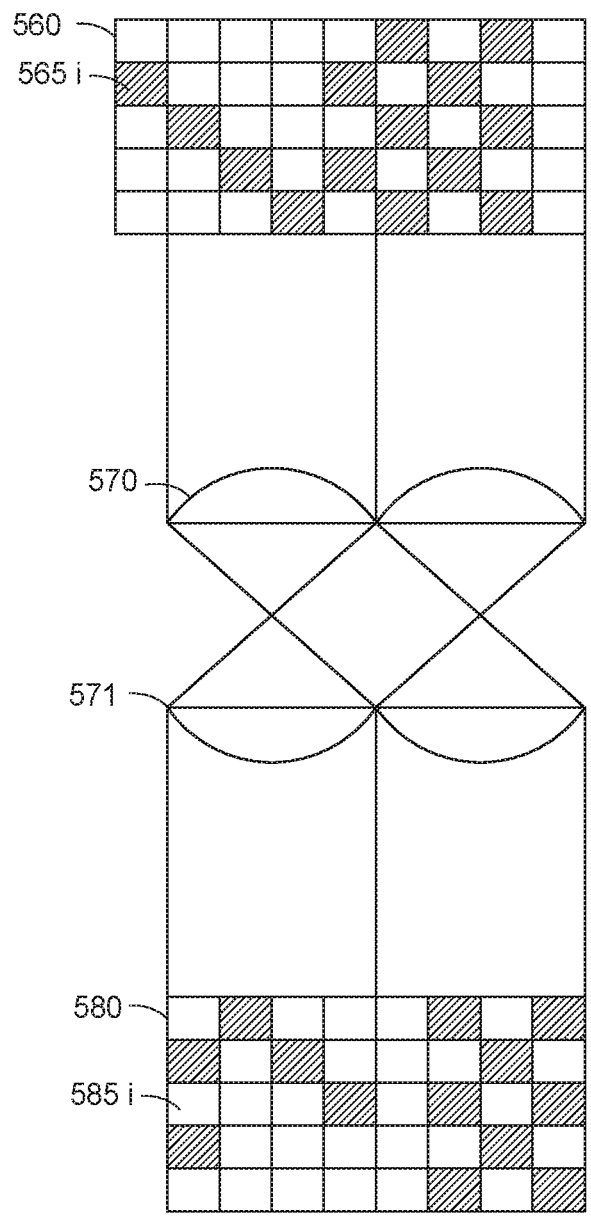

Returning to FIG. 4, the combination of the projection lens 220 with the angle-enhancing screen 400 that includes the Fresnel field lens 410 and the array of Keplerian lens pairs 420 permits the image 225 to be enlarged, while straightening the views, shrinking each pixel in the image, and increasing the field of view. However, the angle-enhancing screen 400 also flips the image 225 and views such that the left view becomes the right view, and vice versa. As a result, the views may become scrambled or misarranged, ruining the 3D scene. In one embodiment, the rendering application 250 accounts for such flipped views by, e.g., rendering sets of flipped views (one for each lenslet) that are displayed, projected, and then flipped again by the angle-enhancing screen 400, as shown in FIG. 5B. If the lenslet size is larger than the image size, then doing so requires exact image set-to-lens alignment, since without the proper alignment, the view sets will be flipped but not necessarily in the correct places, resulting in an incoherent scene or reduced apparent resolution. This is shown in FIGS. 5B-5C. FIG. 5B illustrates how pre-flipped sub-images $535_i$ of an image 530 are aligned the with a lenslet array 540-541, producing a desired image 550 after the sub-images $535_i$ are flipped by the aligned lenslet array. FIG. 5C illustrates pre-flipped sub-images $565_i$ of an image 560 that are not aligned as planned behind a lenslet array 570-571, and an incoherent resulting image 580 after the sub-images $565_i$ are flipped at wrong places by the mis-aligned lenslet array.

Figure 5D:
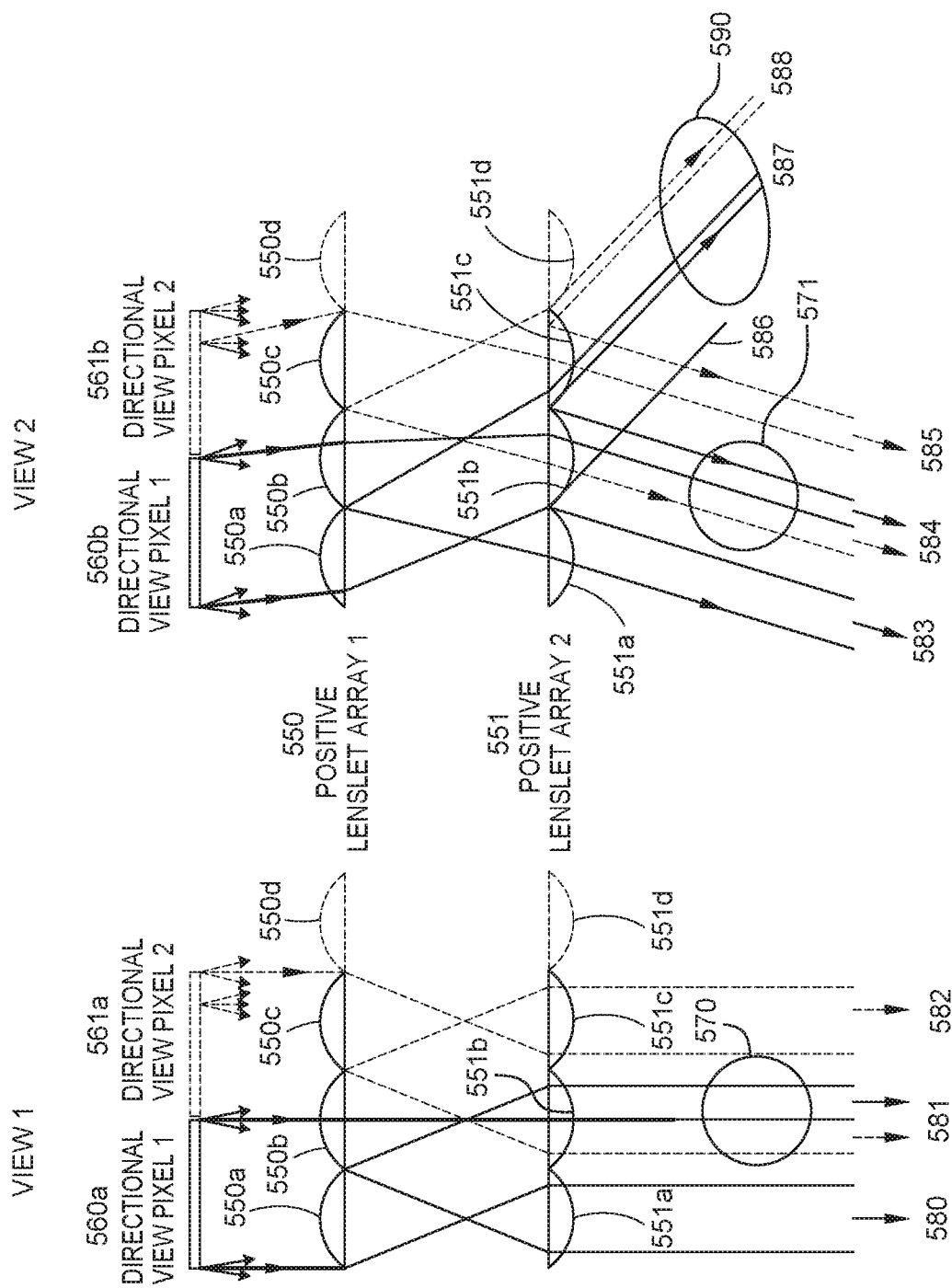
FIGS. 5D and 5E illustrate Keplerian lens array as an angle-enhancing screen with stray views for light fields and collimated multiview displays, and stray views and ghost point images for holographic, volumetric or other variable wavefront 3D displays or objects according to an embodiment.
Figure 5E:
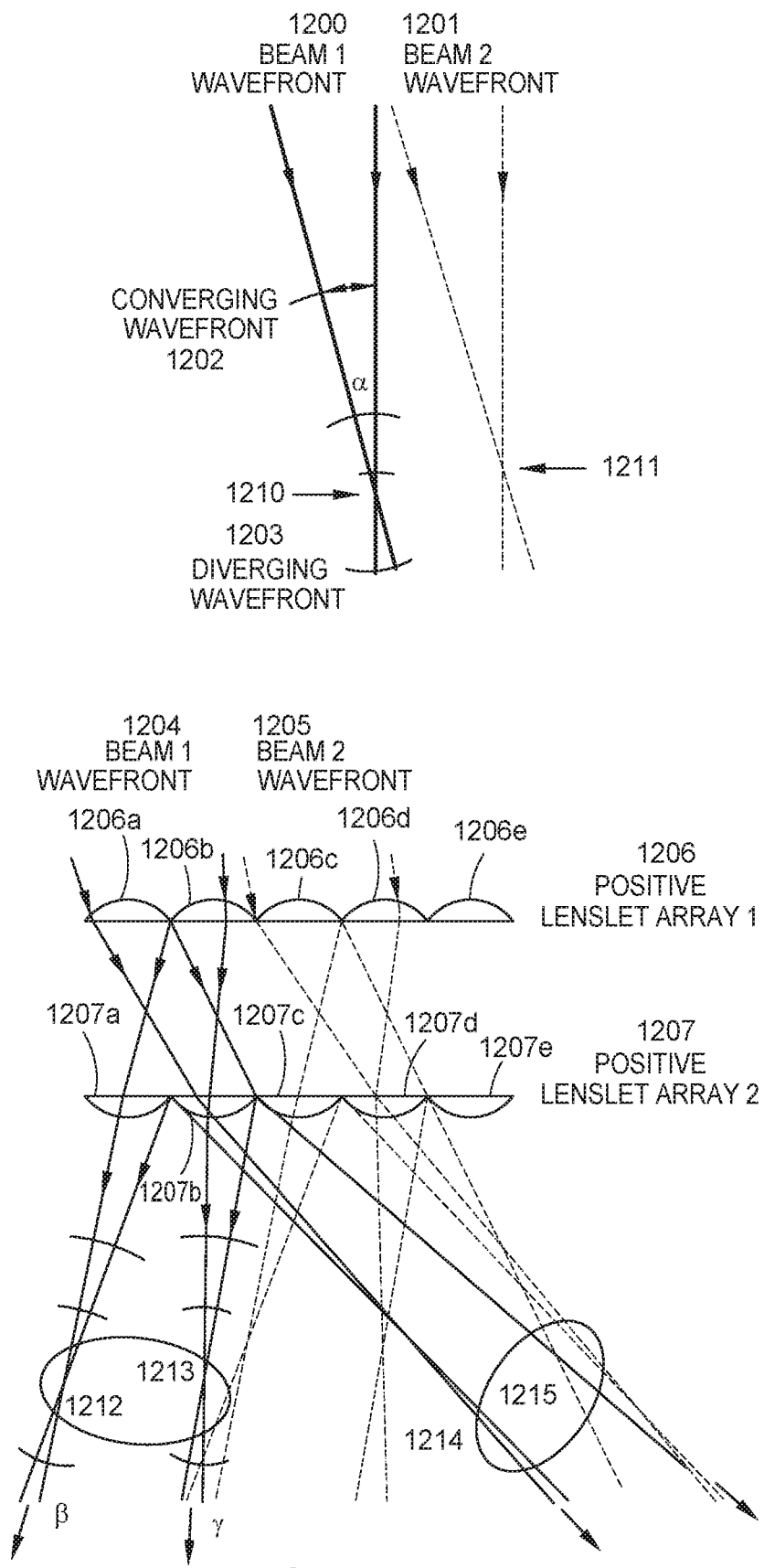

The pixels (or directional view pixels/direls, hogels etc.) imaged on the angle enhancing screen may be of similar but different size than the screen's lenslet pitch. The edges of the pixels and lenslets may also not be aligned or remain aligned. FIGS. 5D and 5E illustrate Keplerian lens array as an angle-enhancing screen with stray views for light fields and collimated multiview displays, and stray views and ghost point images for holographic, volumetric or other variable wavefront 3D displays or objects. Specifically, FIG. 5D shows two views (View1, View2) from a pair of adjacent directional view pixels (560A, 561A; 560B, 561B) as they are magnified by a Keplerian lens array 550, 551 composed of lenslets 550*a,b,c* and 551*a,b,c,d*. In View 1, the light from directional view pixel 1 (560A) fills lenslet 550*a*, but only a portion of lenslet 550*b*. Similarly, the light from directional view pixel 2, 561A, fills the remainder of lenslet 550*b*, and all of lenslet 550*c*. The Keplerian lens array, 550 and 551, creates three separate images, 580, 581, 582 of directional view pixels 560A, 561A. Image 580 is a magnified image of view pixel 1, 560A; image 582 is a magnified image of view pixel 2, 561A; and image 581 is a flipped combination of view pixel 1, 560A, and view pixel 2, 561A. As a result of image 581 being a flipped combination of view pixels, 560A, 561A, the borders between pixel images may appear stripped or blurred.

Similarly for View 2, the off-axis light from directional view pixel 1, 560B, fills lenslet 550*a*, but only a portion of lenslet 550*b*. The off-axis light from directional view pixel 2, 561B, fills the remainder of lenslet 550*b*, and all of lenslet 550*c*. The Keplerian lens array, 550 and 551, creates three separate images, 583, 584, 585, of directional view pixels 560B, 561B. The images 583,584,585 are smaller in size than pixels 560B, 561B but have larger off-axis view angles. Image 584 is a flipped combination of directional view pixels 560B, 561B. Additionally, stray beams, 586, 587, 588 are created due to light from lenslets 560a,b,c in array 550 entering lenslets other than their corresponding lenslets, 551a,b,c in array 551. For example, the stray beam 587 is due to light from lenslet 560b entering lenslet 561c instead of its corresponding lenslet 561b. Stray beams are an imaging artifact and may create cross-talk that harms the 3D imagery.

To use an angle enhancing screen for holograms, volumetric displays and other 3D imagery with focus cues, the effects that the screen has on wavefronts, rather than just collimated views such as those used in light fields and other multiview displays, should be considered. FIG. 5E shows two beams 1200 and 1201, with converging wavefronts 1202 focusing to points 1210 and 1211 respectively, each at different depths, then expanding beyond with diverging wavefronts 1203. The light intensity along the beam's wavefronts (not shown) may also vary, similar to views in multiview displays. An angle enhancing screen placed in front of a beam that focuses to a single point (with a small angle of convergence, α), passes a corresponding beam also focused to a single point, but with a larger angle of convergence, β, (and maintaining the intensity variation along its wavefront; i.e., views). FIG. 5E also illustrates two beams with converging wavefronts, 1204,1205 (focused to two points at different depths) impinge on an angle enhancing screen composed of Keplerian lens array 1206,1207. These two beams are shown separate, but could overlap. Beam 1204 has an angle of convergence α. Beam 1204 fills lenslet 1206a and part of lenslet 1206b. The light from lenslet 1206a focuses then expands and fills part of its corresponding lens 1207a and a neighboring lenslet 1207b. The light from the corresponding lenslet 1207a focuses to a point 1212 with an angle of convergence β, and the light from the neighboring lenslet 1207b creates a stray beam 1214. Similarly the light from beam 1204 and lenslet 1206b focuses then expands and fills part of its corresponding lens 1207b and a neighboring lenslet 1207c. The light from the corresponding lenslet 1207b focuses to a point 1213 with an angle of convergence γ, and the light from the neighboring lenslet 1207c creates a stray beam 1215. When operating on Beam 1204, the Keplerian lens arrays 1206,1207 produces two beams converging to two widely separated focused points 1212,1213, rather than a desired single point. Either beam producing point 1212 or 1213 has a small convergence angle. The two resulting beams will eventually overlap a far distance from the screen with a combined beam waist that is much larger than a lenslet (e.g. 1206a) or the original beam 1204 width. The lenses 1206c,d affect beam 1205 similarly (multiple points and stray beams), but the points focus at a different depth. Due to the separate focused points and the stray beams, the Keplerian lens arrays 1206, 1207 may not work well as an angle expanding screen for non-planar (collimated) wavefronts.

Figure 6:
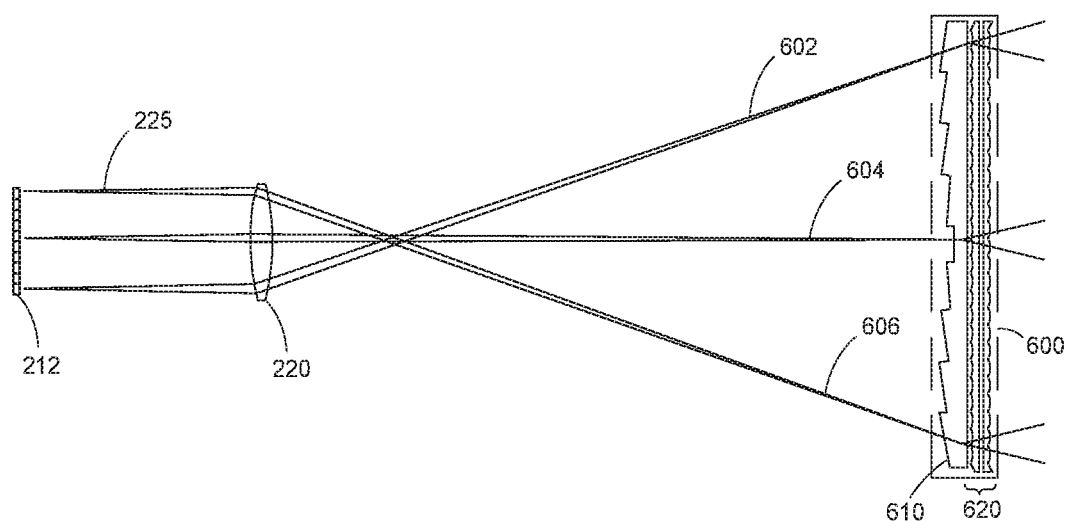
FIG. 6 illustrates an angle-enhancing screen, according to another embodiment.

FIG. 6 illustrates an angle-enhancing screen 600, according to another embodiment. As shown, the angle-enhancing screen 600 includes a Fresnel field lens 610 that straightens the views (e.g., views 602, 604, and 606) and an array of Galilean lens pairs 620. The array of Galilean lens pairs 620 is a double lenslet array that includes matched lenslet pairs in the array that each includes one positive (converging) lens and one corresponding negative (diverging) lens, i.e., a Galilean telescope. By using Galilean lens pairs that form Galilean telescopes rather than Keplerian telescopes, the angle-enhancing screen 600 decreases the image pixel sizes and increases the field of view, without flipping the views. As with the angle-enhancing screen 400, the angle-enhancing screen 600 maintains a size of the final image, with spaces between pixels.

Figure 7A:
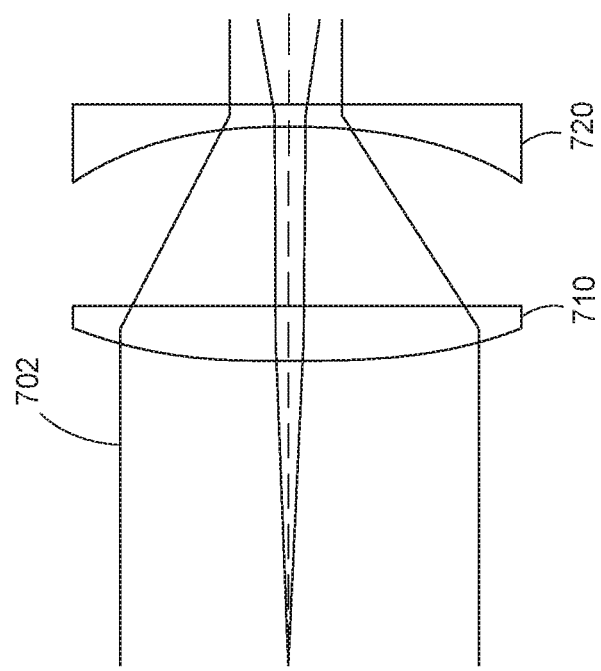
FIG. 7A illustrates a Galilean lens pair in the angle-enhancing screen of FIG. 6, according to an embodiment.
Figure 7C:
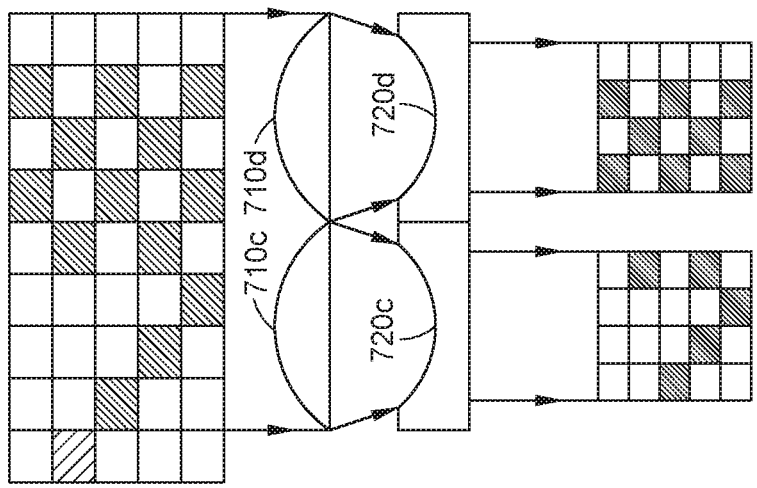
FIGS. 7B and 7C illustrate Galilean lens pairs that do not flip images and do not need alignment, according to an embodiment.
Figure 7B:
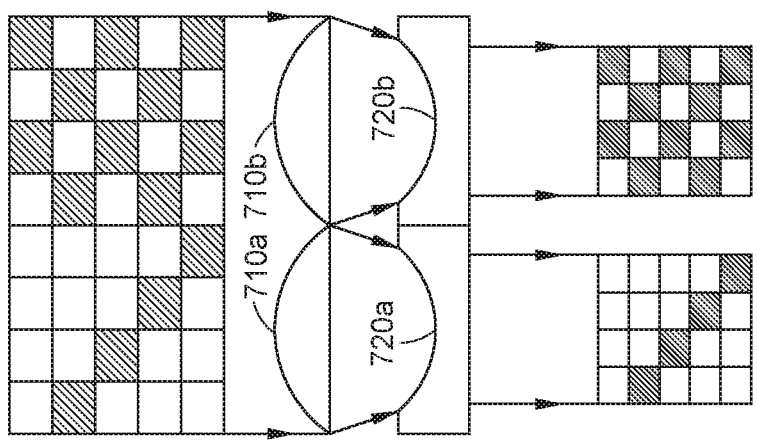

FIG. 7A illustrates an example pair of Galilean lenses 710 and 720 in the array of Galilean lens pairs 620, according to an embodiment. As shown, the Galilean lens pair 710 and 720 includes a positive lens 710 and a negative lens 720, in contrast to the Keplerian lens pair 510 and 520 described above, which were both positive lenses. A collimated light beam 702 passes through the positive (converging) lens 710, which converges the light beam but, before the converged light beam is focused and flips the views, the converged light beam is passed through the negative (diverging) lens 720, which recollimates the light beam. As a result, images and views are not flipped by the array of Galilean lens pairs 620, and perfect pixel-to-lens alignment is also not required, if the lenslets are larger than projected pixels. This is illustrated by the positive lens 710-a-d and the negative lenses 720a-d in FIGS. 7B and 7C, for aligned and non-aligned pixel-to-lens arrangements. Further, like the Keplerian lens pair 510 and 520, the Galilean lens pair 710 and 720 operates to decrease an image pixel (or direl, hogel, etc.) size (area), as well as create a larger field of view, when light for the pixel passes through the Galilean lens pair 710 and 720 (from left to right in FIG. 7). This once again results from the optical invariant, which requires a decrease in size to be associated with an increased field of view in order for the product of the size and field of view to remain constant.

FIG. 7D shows two views (View 1, View 2) from a pair of adjacent directional view pixels (760A, 761A; 760B, 761B) as they are magnified by a Galilean lens array 750, 751 composed of lenslets 750a,b,c and 751a,b,c,d. In view 1, the light from directional view pixel 1 (760A) fills lenslet 750a, but only a portion of lenslet 750b. Similarly, the light from directional view pixel 2, 761A, fills the remainder of lenslet 750b, and all of lenslet 750c. The Keplerian lens array, 750 and 751, creates three separate images, 780, 781, 782 of directional view pixels 760A, 761A. Image 780 is a magnified image of view pixel 1; 760A, image 782 is a magnified image of view pixel 2, 761A; and image 781 is a combination of view pixel 1,760A, and view pixel 2, 761A, but the image portions remain in the same spatial order as their source pixels. As a result of image 781 being a flipped combination of view pixels, 760A, 761A, the borders between pixel images are consistent and sharp.

The Galilean lens array also handles non-planar wavefronts well and works as an angle enhancing screen for holograms, volumetric displays and other 3D imagery with focus cues. FIG. 7E shows two beams 1300 and 1301, with converging wavefronts 1302 focusing to points 1310 and 1311 respectively, each at different depths, then expanding beyond with diverging wavefronts 1303. The light intensity along the beam's wavefronts (not shown) may also vary, similar to views in multiview displays. We expect an angle enhancing screen place in front of a beam focusing to a single point (with a small angle of convergence, α), would pass a corresponding beam also focused to a single point, but with a larger angle of convergence, β, (and maintaining the intensity variation along its wavefront; i.e. views). From FIG. 7E, two beams with converging wavefronts, 1304, 1305 (focused to two points at different depths) impinge on an angle enhancing screen composed of Galilean lens array 1306, 1307. The two beams are shown separate, but could overlap. Beam 1304 has an angle of convergence α. Beam 1304 fills lenslet 1306a and part of lenslet 1306b. The light from lenslet 1306a converges and fills part of its corresponding negative lens 1307a. In one embodiment, due to the close proximity of negative lenslet array 1307 to positive lenslet array 1306, the light from lenslet 1306a does not have the travel distance to enter neighboring negative lenslet 1307b, and therefore, stray beams are not produced by this mechanism for the range of projection angles expected. The light from the corresponding lenslet 1307a focuses to a point 1316 with an angle of convergence β. Similarly the light from beam 1304 and lenslet 1306b converges then expands and fills part of its corresponding lens 1307b. The light from the corresponding lenslet 1307b focuses to a point 1317 with an angle of convergence γ. When operating on Beam 1304, the Galilean lens arrays 1306,1307 produces two beams converging to two closely separated focused points 1316, 1317, and overlap a short distance away with a combined beam waist that is similar in size to a lenslet (e.g. 1306a) or the original beam 1304 width. This produces an effective extended point 1318 at the beam waist with a large convergence angle. Either beam producing point 1316 or 1317 has a small convergence angle (β and γ) but their combined angle is larger than the original beam's 1304 convergence angle. The intensity variation of the wavefront (views) are also preserved and maintain their relative distribution. An eye would see and focus to the extended point and the point's intensity would change as expected over a wide viewing angle. The lenses 1306c,d and 1307c,d behave similarly to beam 1305 (two closely separated beams that overlap at a waist a short distance away, with a combined convergence angle larger than the original convergence angle), but the point focus is at a different depth. Due to the effective extended point with a large combined convergence angle, preservation of wavefront intensity variation, and the lack of stray beams, the Galilean lens arrays 1306,1307 works well as an angle expanding screen for arbitrary wavefronts.

Returning to FIG. 6, the combination of the projection lens 220 with the angle-enhancing screen 600 that includes the Fresnel field lens 610 and the array of Galilean lens pairs 620 permits the holographic image 225 to be enlarged, while straightening the views, shrinking each pixel in the image, and increasing the field of view. In addition, the views are not flipped. As the views are not out of order when the views are demagnified, the alignment and matching of lenslet and image sections/elements described above with respect to the array of Keplerian lenses is no longer needed or reduced. Further, the Fresnel lens in FIGS. 6 and 7A may come before or after the lenslet array, and if the Fresnel lens is after the lenslet array, then the diverging lenslets can be molded onto the flat face of the Fresnel lens. That is, the diverging lenslet array could be embossed on the back of the Fresnel lens, and molding them into one piece may help alignment and/or cost.

Figure 8:
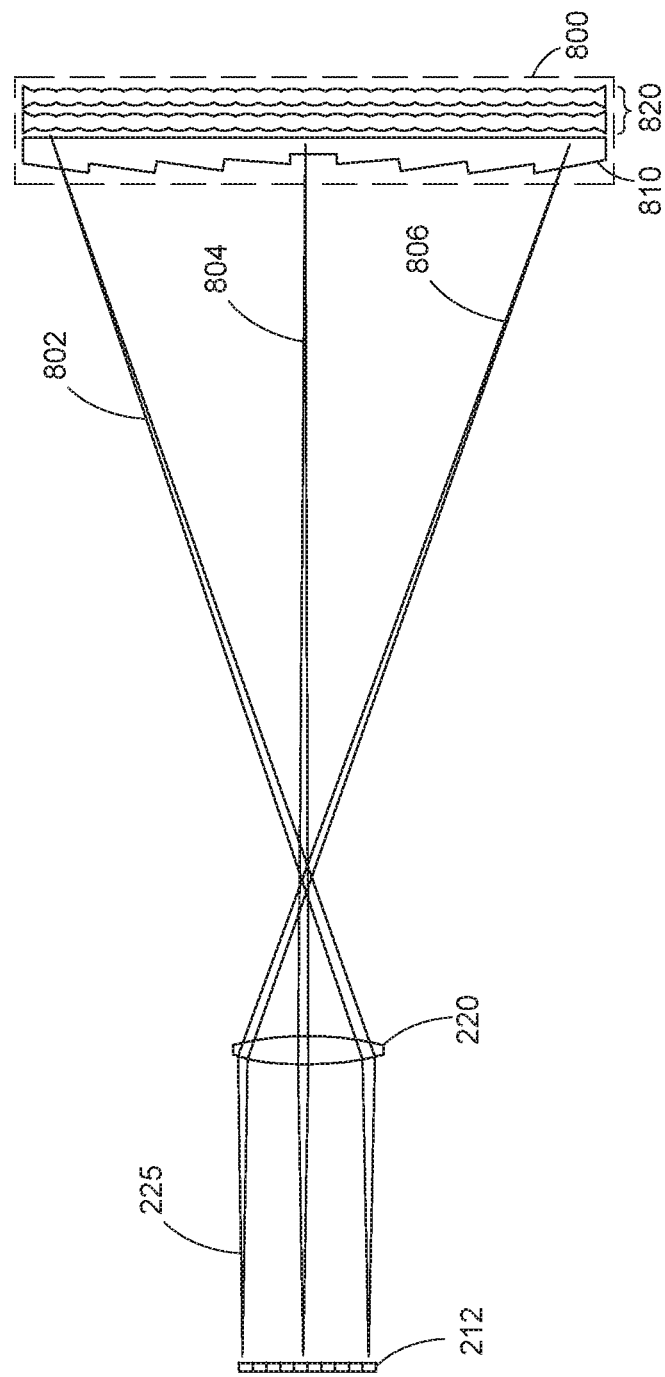
FIG. 8 illustrates an angle-enhancing screen, according to another embodiment.

FIG. 8 illustrates an angle-enhancing screen 800, according to another embodiment. As shown, the angle-enhancing screen 800 includes a Fresnel field lens 810 that straightens the views (e.g., views 802, 804, and 806) and an array of Keplerian lens quartets 820. The array of Keplerian lens quartets 820 in the angle-enhancing screen 800 is a quadruple lenslet array including an array of four positive lenslet quartets that is equivalent to two Keplerian arrays in series. Such a quadruple lenslet array acts to decrease the image pixel sizes and increase the field of view, while producing an erect image without flipped views, as the second double lenslet array in the quadruple lenslet array unflips the flipped views produced by the first double lenslet array in the quadruple lenslet array. That is, the quadruple lenslet array in the quadruple lenslet array may be used to demagnify an image and flip the image twice, resulting in a magnified but erect (unflipped) image section, thereby avoiding a flipping of views. As with the angle-enhancing screen 400, the angle-enhancing screen 800 also maintains a size of the final image, with spaces between pixels.

Figure 9:
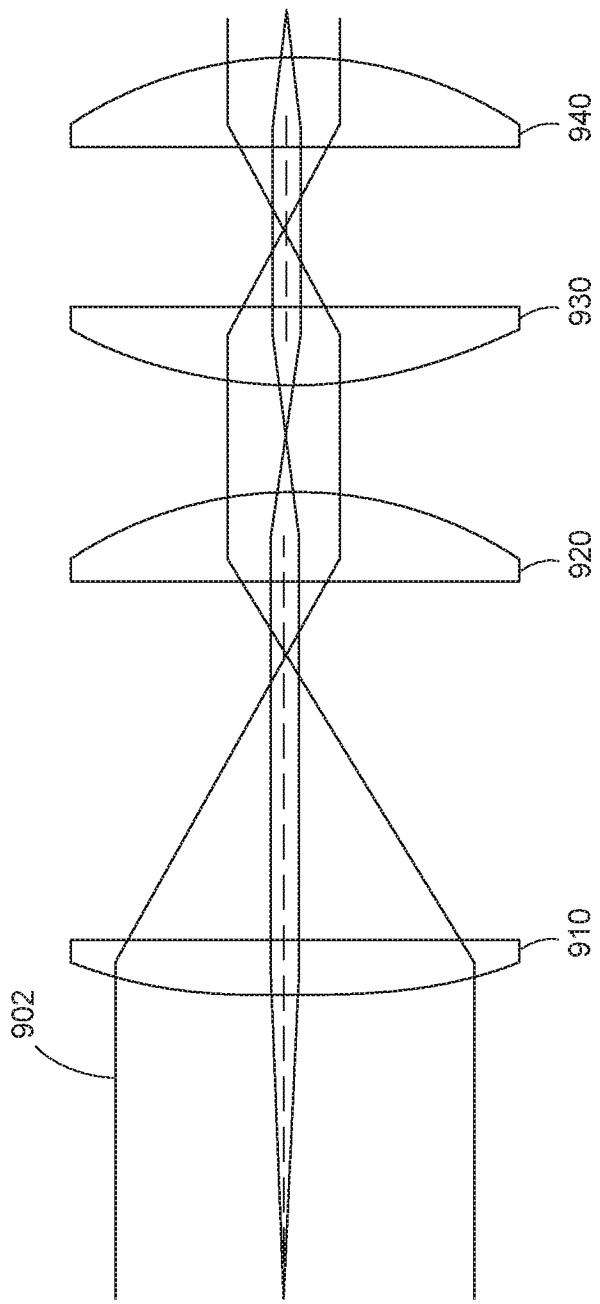
FIG. 9 illustrates a Keplerian lens quartet in the angle-enhancing screen of FIG. 8, according to an embodiment.

FIG. 9 illustrates an example Keplerian lens quartet 910, 920, 930, and 940 in the angle-enhancing screen of FIG. 8, according to an embodiment. As shown, the Keplerian lens quartet 910, 920, 930, and 940 includes lenses 910 and 920 that correspond to the Keplerian lens pair 510 and 520 described above with respect to FIG. 5. In particular, the lenses 910 and 920 are positive back-to-back lenses, with collimated parallel light that enters the lens 910 being focused between the lenses 910 and 920 at a point that is closer to the lens 920, expanded out again, and deflected by the lens 920 to become a collimated parallel light beam that is less thick than the collimated parallel light beam that originally entered the lens 910. In addition, the Keplerian lens quartet 910, 920, 930, and 940 includes lenses 930 and 940 that unflip the flipped views produced by the Keplerian lens pair 910 and 920. As shown, the lenses 930 and 940 are also positive back-to-back lenses, but collimated parallel light that enters the lens 930 is focused between the lenses 910 and 920 at a point that is an equivalent distance between the lens 930 and 940, expanded out again, and deflected by the lens 940 to become a collimated light beam that is equal in thickness to the collimated light beam that entered the lens 930. As a result, the Keplerian lens quartet 910, 920, 930, and 940 decreases the size of the pixel and creates a larger field of view (as a result of the optical invariant), without flipping the views.

Returning to FIG. 8, the combination of the projection lens 220 with the angle-enhancing screen 800 that includes the Fresnel field lens 810 and the array of Keplerian lens quartets 820 permits the holographic image 225 to be enlarged, while straightening the views, shrinking each pixel in the image, and increasing the field of view. In addition, the views are not flipped.

Figure 10:
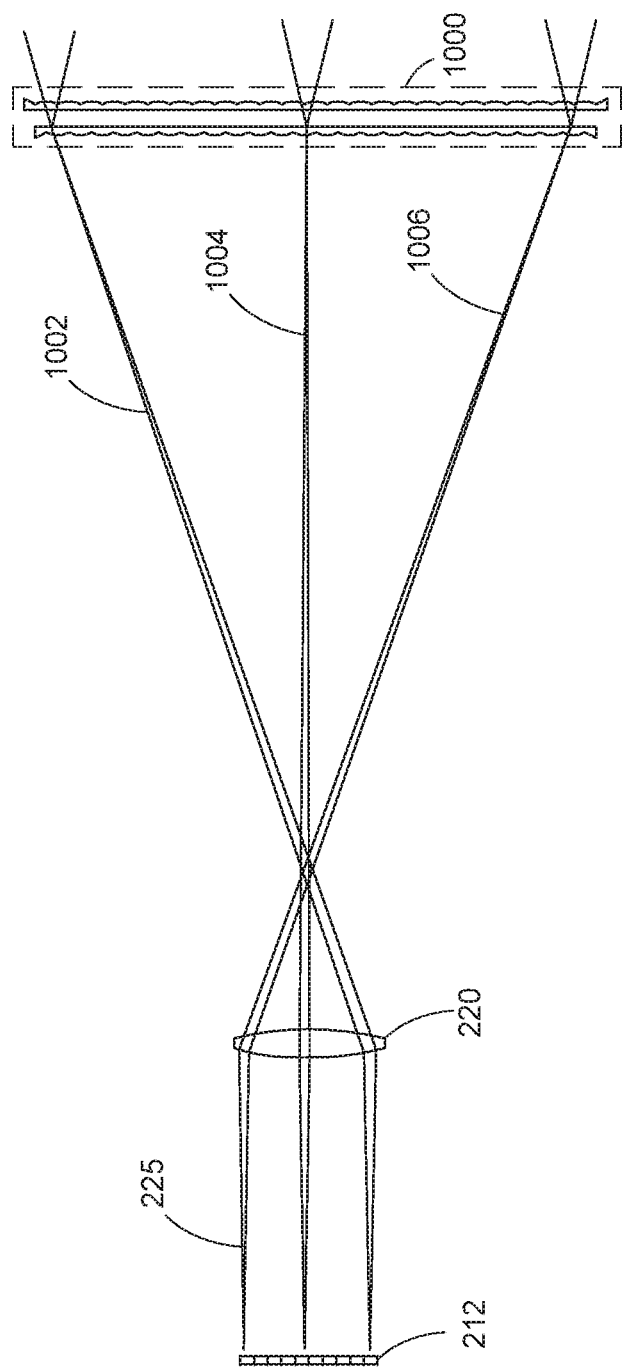
FIG. 10 illustrates an angle-enhancing screen, according to another embodiment.

FIG. 10 illustrates an angle-enhancing screen, according to another embodiment. As shown, the angle-enhancing screen 1000 includes a Gabor superlens. In some embodiments, the Gabor superlens may include lenslet pairs/quartets, such as an array of Keplerian or Galilean lens pairs or an array of Keplerian quartets, with two lenslet arrays of different focal lengths to demagnify the image and increase the field of view. Illustratively, the Gabor superlens of the angle-enhancing screen 1000 includes a Galilean lens pair array. Unlike the Galilean lens pair 620, the double lenslet arrays in the Gabor superlens of the angle-enhancing screen 1000 are not aligned. As discussed in greater detail below, such a Gabor superlens takes advantage of the property that unaligned lenses converge and redirects ray bundles so that a lens-like structure can be created with two arrays of lenslets with mismatched pitches. In particular, at the center of the two lenslet arrays, the lenslets may be aligned so as to not deflect ray bundles, while at larger radial distances, the shift in the lenses may be increased such that the deflection increases, thereby converging the light bundles as a single lens would. This is different from the typically Gabor superlens, which uses two arrays of the same focal length but different pitches. As a result, there is more and more misalignment (and beam steering) toward the edges, and the Gabor superlens acts like a large flat lens. By contrast, the angle-enhancing screen 1000 needs a magnifying lenslet array for angle enhancement, and a large flat field lens (like a Gabor superlens), so angle-enhancing screen 1000 essentially combines the two: a Gabor superlens with different focal lengths to both enhance the angle and to straighten the views.

Figure 11:
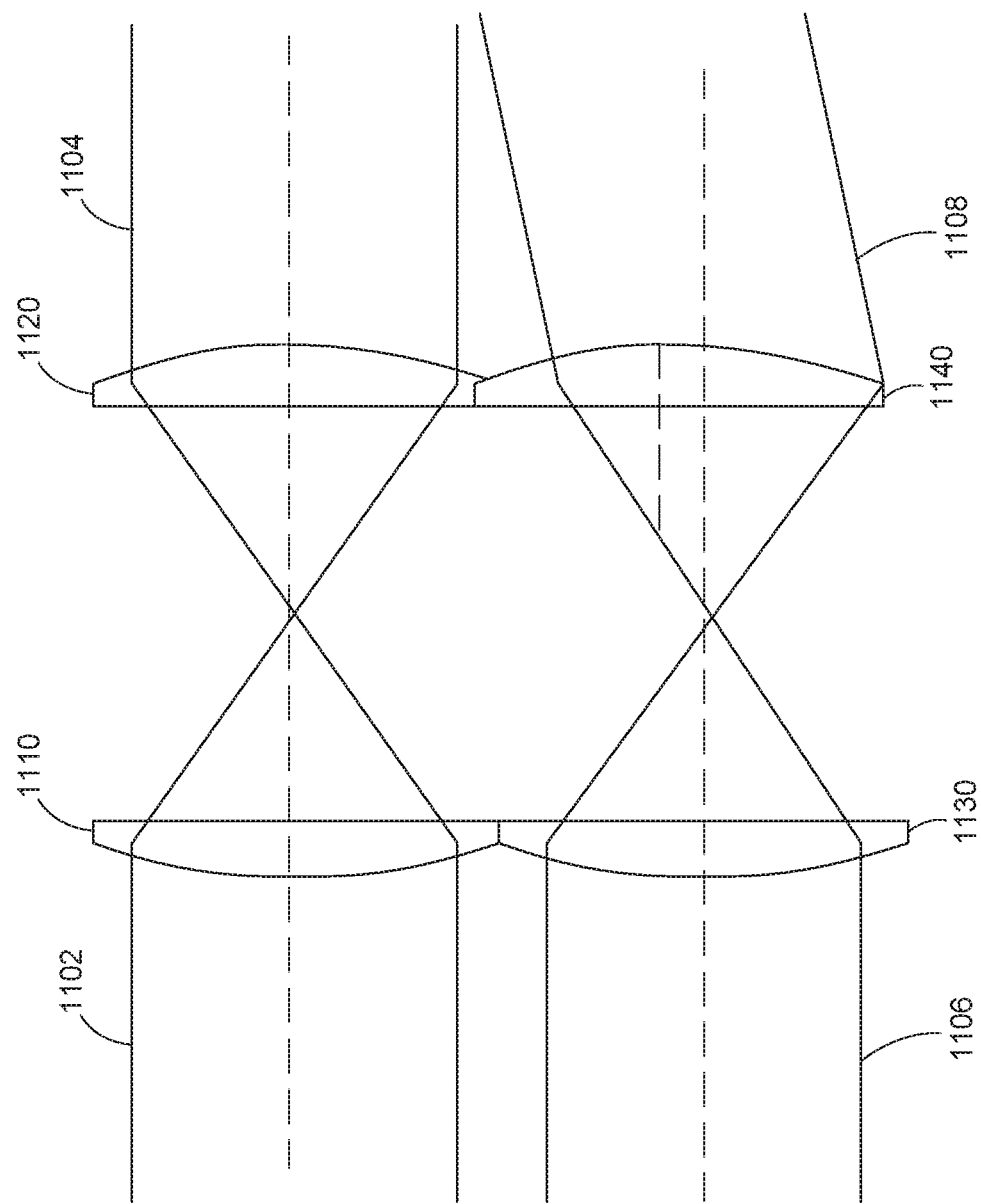
FIG. 11 illustrates lens pairs in the angle-enhancing screen of FIG. 10, according to an embodiment.

FIG. 11 illustrates example pairs of lenses in the Gabor superlens in the angle-enhancing screen 1000 of FIG. 10, according to an embodiment. As shown, the pairs of lenses include a first lens pair 1110 and 1120 and a second lens pair 1130 and 1140, with the lens pairs having different pitches (i.e., the spacing between lenses is different). Illustratively, the unaligned lens pair 1130 and 1140 causes a light beam 1106 to be deflected as a deflected beam 1108, which differs from an aligned lens pair that would not deflect a light beam. That is, with an aligned lens pair, a collimated horizontal beam entering straight in leaves from the same optical axis, whereas with an offset lens such as the unaligned lens pair 1130 and 1140, a collimated beam entering straight in is deflected. Further, as described above, the lens pairs 1110 and 1120, and 1130 and 1140, may be Keplerian or Galilean lens pairs that also demagnify the image and increase the field of view. That is, the Gabor superlens of the angle-enhancing screen 1000 may include two lenslet arrays with different focal lengths (e.g., an array of Keplerian or Galilean lens pairs) that demagnifies an image and increases the field of view, as well as different pitches to redirect/deflect the views to account for the skewed views produced by the projection lens 220.

Returning to FIG. 10, by having two lenslet arrays with different pitches (i.e., the spacing between lenses in the lenslet arrays is different) and a mismatch that grows towards the edges of the Gabor superlens of the angle-enhancing screen 1000, the angle of deflection by pairs of lenses in the Gabor superlens becomes greater toward the edges, such that the Gabor superlens acts the way a single lens such as the Fresnel field lens 410 would, by deflecting more on the edges of the Gabor superlens than in the middle of the Gabor superlens. In one embodiment, the Gabor superlens of the angle-enhancing screen 1000 includes, at its middle, pairs of lenses configured to not deflect light, and, at its outer edges, pairs of lenses configured to deflect light to be concentrated at a focal point, or reimage an object and the focal plane. In such a case, light at the edges of the Gabor superlens is deflected back toward the middle of the Gabor superlens, such that the Gabor superlens may be used in lieu of a Fresnel field lens in addition to the lenslet arrays. Doing so removes the need for the Fresnel field lens, which may be relatively large, expensive, and time consuming to construct. The combination of the projection lens 220 with the Gabor superlens permits the holographic image 225 to be enlarged, while straightening the views and enlarging the field of view (and shrinking each pixel in the image). In addition, the views are not flipped.

Although discussed above primarily with respect to holographic displays, the angle-enhancing screens disclosed herein may generally be used for 3D scenes generated by any 3D displays, including light field projectors, optical vortex displays, magnifying volumetric displays, multi-layer displays, lenticular displays, spinning light field displays, etc. For example, holograms differ from light fields in that light fields only reproduce light ray directions and intensities and only approximate wavefront curvature; whereas holograms reproduce the wavefront of the 3D object including the wavefront curvature related to 3D points at different depths; however current modulators typically allow only small holograms with small fields of view to be produced. As another example, optical vortex displays may utilize different optical angular momentum (OAM) modes to encode images into different spirals of light that can be projected onto a surface and decoded on the other side into different angles. However, the phase modulators (e.g., LCOS) in such optical vortex displays need to have a high resolution and dense pixel pitch to properly create and encode a light beam's various OAM modes, and such modulators tend to have small areas and pitch, leading to small images and a small number of encoded images. In each of these cases, the angle of deflection may be relatively small and the spatial size of the 3D image may also be small, which may be remedied using a projection lens and the angle-enhancing screens disclosed herein. Real-world scenes may even be projected onto the angle-enhancing screens disclosed herein to magnify such scenes, which is akin to magnifying 2D images with an overhead projector, except in 3D.

Although discussed herein primarily with respect to two-dimensional (2D) lenslet arrays (with spherical lenses) and holograms which have full parallax, in the case of enlarging horizontal-parallax only systems, including 3D lenticular displays, one-dimensional (1D) lenticular arrays (cylindrical lenses) may also be used in the lenslet pairs/quartets. In the 1D case, however, an anisotropic vertical diffuser is required, such as a fine pitch lenticular sheet (cylindrical lens array with their long non-focusing axis horizontal) or an anisotropic holographic diffuser, on the projection screen after the Fresnel lens or lens array.

Advantageously, angle-enhancing screens are disclosed that can be used in conjunction with a projection lens that expands the size of a 3D image, in order to straighten the views projected by the projection lens and increase the field of view that is decreased when an image is projected to increase its size. In some embodiments, the angle-enhancing screen includes a Fresnel field lens and an array of either Keplerian lens pairs, Galilean lens pairs, or Keplerian lens quartets. In such cases, the angle-enhancing screen straightens the views of light projected onto the screen and increases the field of view. An array of Keplerian lens pairs flips the views, which needs to be accounted for by a rendering application, whereas an array of Galilean lens pairs or Keplerian lens quartets does not flip the views. Another embodiment uses a Gabor superlens in lieu of a Fresnel field lens and double lenslet array, with the Gabor superlens being able to can scale and deflect light passing through it. As the angle-enhancing screens disclosed herein are afocal, a hologram's accommodation cues are maintained by such screens. Experience has shown that angle-enhancing screens according to embodiments disclosed herein may be used to create large (e.g., 55" diagonal), wide field of view (e.g., 30-60°) holographic videos using a single SLM, as opposed to multiple SLMs, possibly with scanners. Further, a hologram displayed on an SLM with N pixels can produce N/2 views and variable wavefront curvature (e.g., a high definition SLM that is 1920 pixels across can generate 960 views compressed into a small field of view), so if the field of view of the holographic image is increased, the hologram's view density (views/degree) may still be large enough to create a deep 3D scene.

Herein, reference is made to embodiments of the invention. However, it should be understood that the invention is not limited to specific described embodiments. Instead, any combination of the features and elements discussed above, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The block diagrams in the Figures illustrate the architecture, functionality, and operation of possible implementations of systems, methods and computer program products according to various embodiments of the present invention. In this regard, block diagrams may represent a module, segment, or portion of code, which comprises one or more executable instructions for implementing the specified logical function(s). It will also be noted that each block of the block diagrams, and combinations of blocks in the block diagrams, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An angle-enhancing screen, comprising:
    a plurality of Galilean lens arrays that comprises converging and diverging lenslet arrays, wherein the converging and diverging lenslet arrays are two-dimensional (2D) arrays configured to produce an image by:
        increasing a field of view of a plurality of picture elements that forms the image, wherein light for the plurality of picture elements passes through a first surface of the converging lenslet array and exits a second surface of the converging lenslet array before it is focused, wherein the light then passes through a first surface, of the diverging lenslet array, that recollimates the light exiting from a second surface of the diverging lenslet array; and
        as the light for the plurality of picture elements passes through the converging and diverging lenslet arrays, decreasing a size of the plurality of picture elements while maintaining a pitch of the plurality of picture elements, wherein the produced image is upright in orientation relative to the image, wherein the converging and diverging lenslet arrays preserve a view order of the plurality of picture elements in the produced image; and
    a field lens configured to straighten views of the plurality of picture elements before or after the light for the plurality of picture elements passes through the converging and diverging lenslet arrays.

2. The angle-enhancing screen of claim 1, wherein the field lens comprises a Fresnel field lens.

3. The angle-enhancing screen of claim 1, wherein the angle-enhancing screen acts as an afocal magnifier that preserves, in the produced image, one or more accommodation cues of the image.

4. The angle-enhancing screen of claim 1, wherein the image is selected from a holographic image and a light-field image.

5. The angle-enhancing screen of claim 1, wherein the views are straightened in order to correct a skewing of the views due to directional splaying of the light when projected by a projection lens onto the angle-enhancing screen.

6. The angle-enhancing screen of claim 1, wherein the plurality of Galilean lens arrays increases the field of view of the plurality of picture elements without causing any stray beam to be created.

7. A display system, comprising:
    a three-dimensional (3D) display configured to generate at least one holographic image comprising a plurality of picture elements;
    a projection lens configured to project the at least one image onto an angle-enhancing screen; and
    the angle-enhancing screen, comprising:
        a plurality of Galilean lens arrays that includes a double lenslet array, wherein the double lenslet array comprises a double two-dimensional (2D) lenslet array that includes converging and diverging lenslet arrays configured to produce an image by:
            increasing a field of view of the at least one image projected onto the angle-enhancing screen, wherein light for the at least one image passes through a first surface of the converging lenslet array and exits a second surface of the converging lenslet array before it is focused, wherein the light then passes through a first surface, of the diverging lenslet array, that recollimates the light exiting from a second surface of the diverging lenslet array; and
            as the light for the at least one image passes through the converging and diverging lenslet arrays, decreasing a size of the plurality of picture elements while maintaining a pitch of the plurality of picture elements, wherein the produced image is upright in orientation relative to the image, wherein the converging and diverging lenslet arrays preserve a view order of the plurality of picture elements in the produced image; and a field lens configured to straighten views of the plurality of picture elements before or after the light for the plurality of picture elements passes through the converging and diverging lenslet arrays.

8. The display system of claim 7, wherein the field lens comprises a Fresnel field lens.

9. The display system of claim 7, wherein the angle-enhancing screen acts as an afocal magnifier that preserves, in the produced image, one or more accommodation cues of the at least one image.

10. The display system of claim 7, wherein the at least one image is selected from at least one holographic image and at least one light-field image.

11. The display system of claim 7, wherein the plurality of Galilean lens arrays increases the field of view of the at least one image without causing any stray beam to be created.

12. A display system, comprising:
a three-dimensional (3D) display configured to generate at least one image comprising a plurality of picture elements;
a projection lens configured to project the at least one image onto an angle-enhancing screen;
the angle-enhancing screen comprising:
a plurality of Galilean lens arrays comprising a double two-dimensional (2D) lenticular that includes converging and diverging lens arrays configured to produce an image by:
increasing a field of view of the at least one image projected onto the angle-enhancing screen, wherein light for the plurality of picture elements passes through a first surface of the converging lenslet array and exits a second surface of the converging lenslet array before it is focused, wherein the light then passes through a first surface, of the diverging lenslet array, that recollimates the light exiting from a second surface of the diverging lenslet array; and
as the light for the plurality of picture elements passes through the converging and diverging lens arrays, decreasing a size of the plurality of picture elements while maintaining a pitch of the plurality of picture elements, wherein the produced image is upright in orientation relative to the image, wherein the converging and diverging lenslet arrays preserve a view order of the plurality of picture elements in the produced image;
a field lens configured to straighten views of the plurality of picture elements before or after the light for the plurality of picture elements passes through the converging and diverging lens arrays; and
a vertical diffuser.

13. The display system of claim 12, wherein the angle-enhancing screen acts as an afocal magnifier that preserves, in the produced image, one or more accommodation cues of at least one the image.

14. The display system of claim 12, wherein the field lens comprises a Fresnel field lens.

15. The display system of claim 12, wherein the image comprises a holographic image, wherein the light has non-planar wavefronts, wherein the angle-enhancing screen acts as an afocal magnifier that preserves, in the produced image, one or more accommodation cues of the holographic image.

16. The display system of claim 15, wherein the views are straightened in order to correct a skewing of the views due to directional splaying of the light when projected by a projection lens onto the angle-enhancing screen, wherein the light passes through the diverging lens array after passing through the converging lens array.

17. The display system of claim 16, wherein the projection lens enlarges the holographic image while proportionally reducing the field of view of the at least one holographic image, wherein subsequent to the field of view being reduced, the plurality of Galilean lens arrays increases and at least partially restores the field of view of the at least one holographic image without causing any stray beam to be created.

18. The display system of claim 17, wherein the field lens comprises a Fresnel field lens, wherein the field lens is configured to straighten the views of the plurality of picture elements after the light for the plurality of picture elements passes through the converging and diverging lens arrays;
wherein the diverging lens array and the Fresnel field lens are molded into a single piece to facilitate lens alignment and by embossing the diverging lens array on a back side of the Fresnel field lens.

19. The display system of claim 18, wherein the plurality of Galilean lens arrays preserves an intensity variation of the non-planar wavefronts, wherein the plurality of Galilean lens arrays effectively extends a point of beam convergence to have an increased convergence angle.

20. The display system of claim 12, wherein the at least one image is selected from at least one holographic image and at least one light-field image.

21. The display system of claim 12, wherein the plurality of Galilean lens arrays increases the field of view of the at least one image without causing any stray beam to be created.

* * * * *

UNITED STATES PATENT AND TRADEMARK OFFICE
CERTIFICATE OF CORRECTION

| | |
|---|---|
| PATENT NO. | : 11,435,504 B2 |
| APPLICATION NO. | : 16/454186 |
| DATED | : September 6, 2022 |
| INVENTOR(S) | : Quinn Yorklun Jen Smithwick |

It is certified that error appears in the above-identified patent and that said Letters Patent is hereby corrected as shown below:

In the Specification

In Column 8, Line 19, delete "710-a-d" and insert -- 710a-d --.

In the Claims

In Column 14, Line 41, in Claim 7, after "one" delete "holographic".

Signed and Sealed this
Twenty-first Day of February, 2023

*Katherine Kelly Vidal*

Katherine Kelly Vidal
*Director of the United States Patent and Trademark Office*